(12) United States Patent
Fukatsu

(10) Patent No.: US 8,421,381 B2
(45) Date of Patent: Apr. 16, 2013

(54) BATTERY CHARGING CIRCUIT AND CHARGING METHOD

(75) Inventor: Toshinari Fukatsu, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 252 days.

(21) Appl. No.: 13/040,933

(22) Filed: Mar. 4, 2011

(65) Prior Publication Data

US 2011/0215743 A1 Sep. 8, 2011

(30) Foreign Application Priority Data

Mar. 8, 2010 (JP) ................................. 2010-050372
Jan. 13, 2011 (JP) ................................. 2011-005021

(51) Int. Cl.
*H02J 1/00* (2006.01)

(52) U.S. Cl.
USPC ........... 318/139; 320/128; 320/137; 320/134; 320/136; 340/636.12; 340/636.13; 340/636.15; 340/636.17; 340/636.2; 324/426

(58) Field of Classification Search ................... 320/128, 320/137, 134, 136; 340/636.12, 636.13, 340/636.15, 636.17, 636.2; 318/139; 324/426
See application file for complete search history.

(56) References Cited

U.S. PATENT DOCUMENTS

| | | | | |
|---|---|---|---|---|
| 3,843,918 A | * | 10/1974 | Rhyne | ........................... 320/160 |
| 4,045,717 A | * | 8/1977 | Fallon et al. | ................... 320/160 |
| 6,548,989 B2 | * | 4/2003 | Duff, Jr. | ......................... 320/166 |
| 6,755,267 B2 | * | 6/2004 | Yamada et al. | ............... 180/65.8 |
| 7,245,110 B2 | * | 7/2007 | Duff, Jr. | ......................... 320/166 |
| 7,464,778 B2 | * | 12/2008 | Kato et al. | .................. 180/65.245 |
| 7,677,340 B2 | * | 3/2010 | Ichijo et al. | ............... 180/65.235 |
| 2010/0019723 A1 | * | 1/2010 | Ichikawa | ....................... 320/109 |

FOREIGN PATENT DOCUMENTS

| | | | |
|---|---|---|---|
| JP | 7-87616 A | | 3/1995 |
| JP | 8-126122 A | | 5/1996 |

* cited by examiner

*Primary Examiner* — Rita Leykin
(74) *Attorney, Agent, or Firm* — Sughrue Mion, PLLC

(57) ABSTRACT

A charging circuit is provided that charges a battery for supplying power to a motor drive system that includes a three-phase motor and a three-phase inverter for controlling the three-phase motor. The three-phase inverter includes first to third sets of switching elements. Each set corresponds to one of the three phases. The charging circuit includes a single-phase output transformer, a rectifier circuit, a line, and a controller. The single-phase output transformer includes a secondary side output section having a first terminal and a second terminal. The rectifier circuit is connected in parallel with the three-phase inverter and the battery. The rectifier circuit is also connected to the first terminal of the secondary side output section. The line connects a connecting point between the first set of the switching elements in the three-phase inverter with the second terminal of the secondary side output section. The controller performs on-off control of the first to third sets of the switching elements. During charging of the battery, the controller maintains the first set of the switching elements in an OFF state, and performs the on-off control of at least one set of the second and third sets of the switching elements.

7 Claims, 8 Drawing Sheets

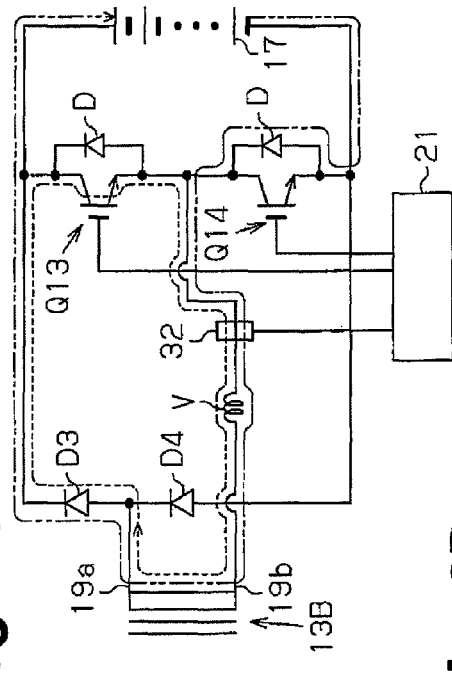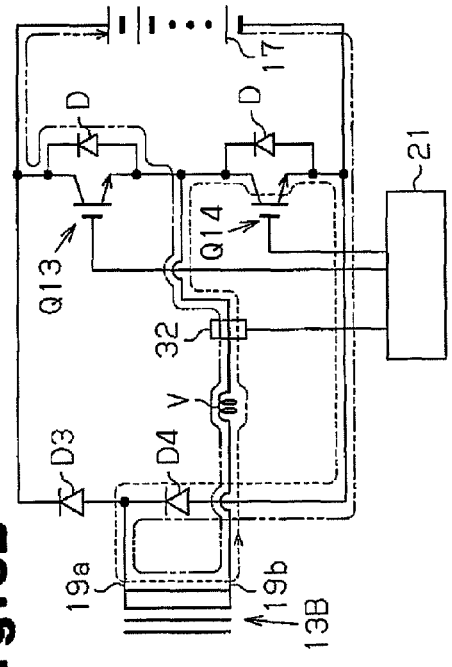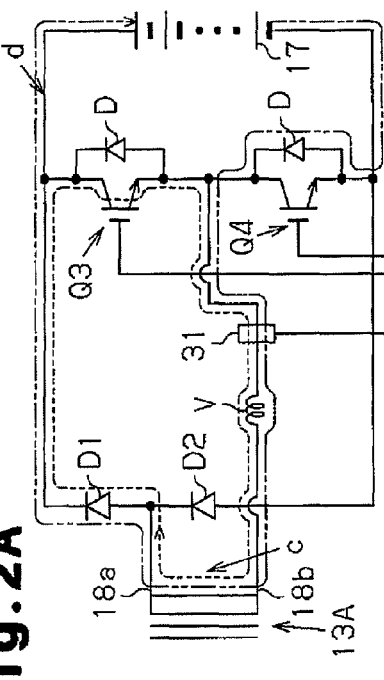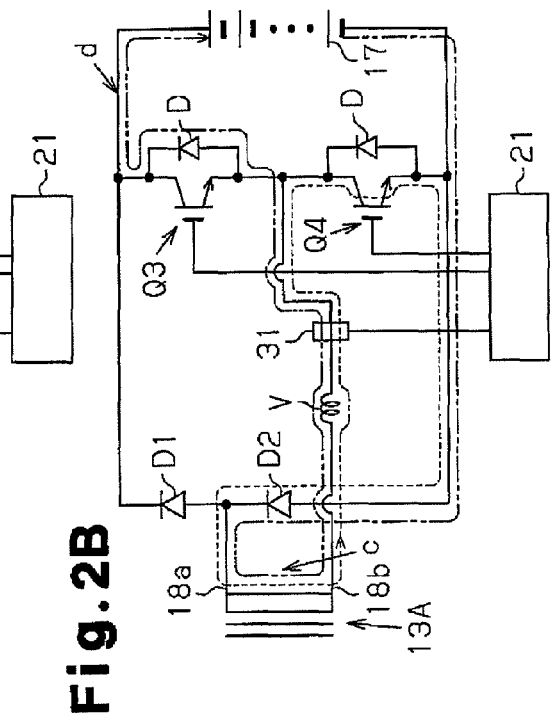
Fig.2A  Fig.2B
Fig.3A  Fig.3B

BATTERY CHARGING CIRCUIT AND CHARGING METHOD

BACKGROUND OF THE INVENTION

The present invention relates to a battery charging circuit, and more particularly, to a battery charging circuit and charging method suitable for charging a battery that supplies power to a motor drive system having a motor such as a vehicle-driving motor and a three-phase inverter for driving the motor, for example, a motor drive system in an electric vehicle or a hybrid vehicle.

A large-sized battery mounted as a power source on a vehicle such as an electric vehicle needs to be charged when the amount of charge is less than or equal to a predetermined amount.

Conventionally, a liquid type lead-acid battery is charged via a quasi-constant voltage transformer and a rectifier circuit. In this charging method, the charging current is greater when the battery voltage is low. As the battery voltage increases, the charging current is reduced.

In the charging method using a quasi-constant voltage transformer, the charging performance depends on the input voltage and the state of the battery. Thus, insufficient charging or overcharging can occur. In a method for performing constant current charging, for example, the constant current-constant voltage-constant current (CC-CV-CC) method, the charging performance does not depend on the input voltage or the state of the battery. However, the method requires a great number of components for the charger, and is therefore costly.

Conventionally, a charger for electric vehicles has been proposed that uses coils in a three-phase motor and a three-phase inverter mounted on an electric vehicle. For example, Japanese Laid-Open Patent Publication No. 8-126122 discloses a charger in which a connector is provided in a part of a line that connects coils of the motor and switching elements of the inverter. When the motor is driven by the battery, the connector is connected. When the battery is charged by an outside alternating-current power source, the connector is disconnected. The publication also discloses a charger without such a connector. In this charger, the positive terminal of a rectifier, which is connected to the outside alternating-current power source, is connected to the neutral point of the coils of the three-phase motor that are connected via a star connection.

The charger of the above publication requires that a connector be provided at a part of the line connecting a motor coil and a switching element of the inverter, and that a rectifier, which is connected to an outside alternating-current power source, be connected to the neutral point of motor coils in a star connection. Therefore, when such a charger (charging circuit) is formed by using a conventional circuit that controls a three-phase motor via a three-phase inverter, not only do components have to be added, but also circuit wiring needs to be modified. This complicates the configuration of the charger.

SUMMARY OF THE INVENTION

Accordingly, it is an objective of the present invention to provide a battery charging circuit and a charging method that allows constant current charging to be performed by adding a small number of components, without modifying the connection state between the coils of a motor or the connection state between an inverter and the motor coils.

To achieve the above object, in one aspect of the present invention, a charging circuit is provided that charges a battery for supplying power to a motor drive system that includes a three-phase motor and a three-phase inverter for controlling the three-phase motor. The three-phase inverter includes first to third sets of switching elements. Each set corresponds to one of the three phases. The charging circuit includes a single-phase output transformer, a rectifier circuit, a line, and a controller. The single-phase output transformer includes a secondary side output section having a first terminal and a second terminal. The rectifier circuit is connected in parallel with the three-phase inverter and the battery. The rectifier circuit is also connected to the first terminal of the secondary side output section. The line connects a connecting point between the first set of the switching elements in the three-phase inverter with the second terminal of the secondary side output section. The controller performs on-off control of the first to third sets of the switching elements. During charging of the battery, the controller maintains the first set of the switching elements in an OFF state, and performs the on-off control of at least one set of the second and third sets of the switching elements.

In another aspect of the present invention, a method for charging a battery that supplies power to a motor drive system including a three-phase motor and a three-phase inverter for controlling the three-phase motor is provided. The three-phase inverter having first to third sets of switching elements, each set corresponding to one of the three phases. A single-phase output transformer having a secondary side output section that has a first terminal and a second terminal is provided. A rectifier circuit is connected in parallel with the three-phase inverter and the battery. The rectifier circuit is connected with the first terminal of the secondary side output section. A connecting point between the first set of the switching elements in the three-phase inverter is connected with the second terminal of the secondary side output section. During charging of the battery, the first set of the switching elements is maintained in an OFF state. The on-off control of at least one set of the second and third sets of the switching elements are performed.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 2A and 2B are equivalent circuit diagrams of a vehicle-driving inverter in the battery charging circuit shown in FIG. 1 when performing charging;

FIGS. 3A and 3B are equivalent circuit diagrams of a cargo-handling inverter in the battery charging circuit shown in FIG. 1 when performing charging;

DETAILED DESCRIPTION OF THE PREFERRED EMBODIMENTS (First Embodiment)

A battery forklift according to a first embodiment of the present invention will now be described with reference to FIGS. 1 to 6. The motor drive system of the battery forklift includes inverters, and a vehicle-driving motor and a cargo-handling motor, which receive power from a battery and are controlled by the inverters. Coils of the vehicle-driving motor and the cargo-handling motor and switching elements of the inverters are used to form a battery charging circuit. In other words, the battery charging circuit is formed by externally attaching additional parts to the inverters of the motor drive system.

Figure 1:
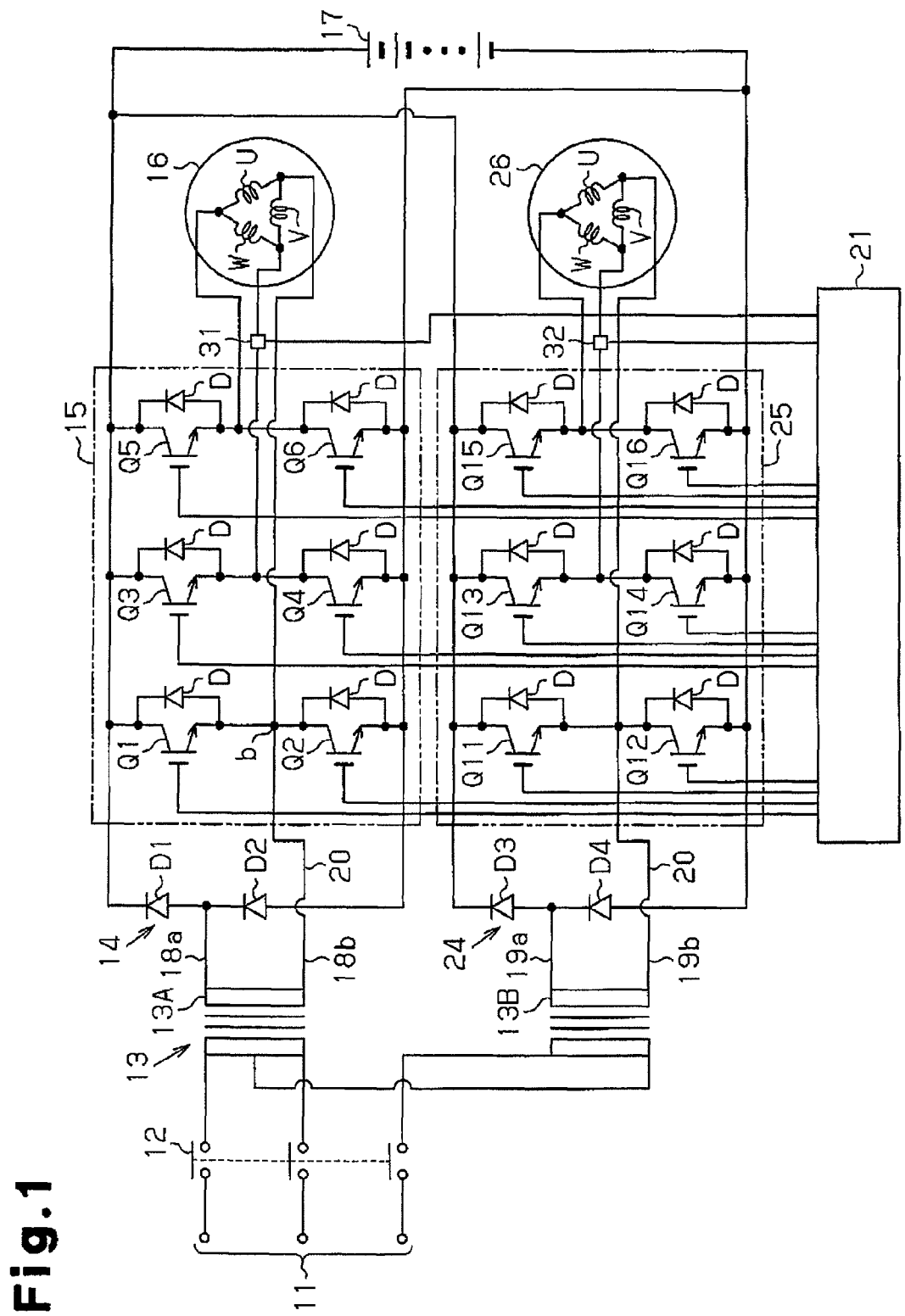
FIG. 1 is a circuit diagram of a battery charging circuit according to a first embodiment of the present invention.

As shown in FIG. 1, the battery charging circuit includes a Scott connection transformer, which is a single-phase output transformer connected to a three-phase alternating-current power source 11 (for example, a commercial power source such as a 200V alternating-current power source) via a switch 12. "The single-phase output transformer" refers to a transformer that has a single phase secondary side output section regardless of whether the primary side input is a single-phase input or a three-phase input. The number of single-phase output sections is not limited to one, but may be two as in a Scott connection transformer. A first single-phase output section 13A of the Scott connection transformer 13 is connected to a first rectifier circuit 14, a vehicle-driving inverter 15, and a vehicle-driving motor 16. A second single-phase output section 13B of the Scott connection transformer 13 is connected to a second rectifier circuit 24, a cargo-handling inverter 25, and a cargo-handling motor 26. The vehicle-driving motor 16 and the cargo-handling motor 26 are three-phase alternating-current motors. The three-phase coils U, V, and W of each of the motors 16, 26 are connected via a delta connection.

The first rectifier circuit 14 is a series circuit having two diodes D1, D2 connected in series, and the connecting point between the diodes D1, D2 is connected to a first terminal 18a of the first single-phase output section 13A. The positive terminal of the first rectifier circuit 14 is connected to the positive terminal of a battery 17, and the negative terminal of the rectifier circuit 14 is connected to the negative terminal of the battery 17.

The vehicle-driving inverter 15 is a three-phase inverter having six switching elements Q1 to Q6, each of which has an insulated-gate bipolar transistor (IGBT). In each set of the first and second switching elements Q1, Q2, the third and fourth switching elements Q3, Q4, and the fifth and sixth switching elements Q5, Q6, the switching elements are connected in series. The collector of each of the switching elements Q1, Q3, Q5 is connected to the positive terminal of the battery 17, and the emitter of each of the switching elements Q2, Q4, Q6 is connected to the negative terminal of the battery 17. A diode D is connected in antiparallel with each of the switching elements Q1 to Q6. That is, the cathodes of the diodes D are connected to the collectors of the switching elements Q1 to Q6, while the anodes of the diodes D are connected to the emitters of the switching elements Q1 to Q6.

The connecting point between the emitter of the switching element Q1 and the collector of the switching element Q2 is connected to the connecting point between the coil U and the coil V of the vehicle-driving motor 16. The connecting point between the emitter of the switching element Q3 and the collector of the switching element Q4 is connected to the connecting point between the coil V and the coil W of the vehicle-driving motor 16. The connecting point between the emitter of the switching element Q5 and the collector of the switching element Q6 is connected to the connecting point between the coil U and the coil W of the vehicle-driving motor 16. Also, the connecting point between the emitter of the switching element Q1 and the collector of the switching element Q2 is connected to a second terminal 18b of the first single-phase output section 13A via a line 20.

The second rectifier circuit 24 is a series circuit having two diodes D3, D4 connected in series, and the connecting point between the diodes D3, D4 is connected to a first terminal 19a of the second single-phase output section 13B. The positive terminal of the second rectifier circuit 24 is connected to the positive terminal of the battery 17, and the negative terminal of the second rectifier circuit 24 is connected to the negative terminal of the battery 17.

The cargo-handling inverter 25 is a three-phase inverter having six switching elements Q11 to Q16, each of which has an insulated-gate bipolar transistor (IGBT). In each set of the first and second switching elements Q11, Q12, the third and fourth switching elements Q13, Q14, and the fifth and sixth switching elements Q15, Q16, the switching elements are connected in series. The collector of each switching element Q11, Q13, Q15 is connected to the positive terminal of the battery 17, and the emitter of each switching element Q12, Q14, Q16 is connected to the negative terminal of the battery 17. A diode D is connected in antiparallel with each of the switching elements Q11 to Q16. That is, the cathodes of the diodes D are connected to the collectors of the switching elements Q11 to Q16, while the anodes of the diodes D are connected to the emitters of the switching elements Q11 to Q16.

The connecting point between the emitter of the switching element Q11 and the collector of the switching element Q12 is connected to the connecting point between the coil U and the coil V of the cargo-handling motor 26. The connecting point between the emitter of the switching element Q13 and the collector of the switching element Q14 is connected to the connecting point between the coil V and the coil W of the cargo-handling motor 26. The connecting point between the emitter of the switching element Q15 and the collector of the switching element Q16 is connected to the connecting point between the coil U and the coil W of the cargo-handling motor 26. Also, the connecting point between the emitter of the switching element Q11 and the collector of the switching element Q12 is connected to a second terminal 19b of the second single-phase output section 13B via a line 20.

The gates of the switching elements Q1 to Q6, and Q11 to Q16 function as control terminals and are connected to a controller 21. The controller 21 is connected to a current sensor 31, which detects a current flowing to the vehicle-driving motor 16, and a current sensor 32, which detects a current flowing to the cargo-handling motor 26. The controller 21 includes a CPU and a memory (nether is shown). The memory stores control programs needed for driving the vehicle-driving motor 16 and the cargo-handling motor 26. Also, the memory stores a program needed to control the switching elements Q1 to Q6 and Q11 to Q16 when charging the battery 17 with the Scott connection transformer 13 connected to the three-phase alternating-current power source 11.

When charging the battery 17, the controller 21 performs on-off control of the third and fourth switching elements Q3, Q4, Q13, and Q14, while maintaining, in the OFF state, the first and second switching elements Q1, Q2, Q11, and Q12, and the fifth and sixth switching elements Q5, Q6, Q15, and Q16. The controller 21 performs the on-off control of the third switching elements Q3, Q13 and the fourth switching elements Q4, Q14, so as to match the current waveform of each of the single-phase output sections 13A, 13B with the voltage waveform thereof. In this description, "matching a current waveform with a voltage waveform" refers to a case where the amount of current is changed in accordance with changes in a voltage. That is, when the voltage is increased, the amount of current is increased, and when the voltage is lowered, the amount of current is reduced. That is, if the voltage waveform is a sinusoidal waveform, the current waveform is changed to a sinusoidal waveform in the same phase as the sinusoidal waveform of the voltage waveform. Since the phases of the first and second single-phase output sections 13A, 13B are not the same, but displaced from each other by 90°, the timing at which the third switching elements Q3, Q13 and the fourth switching elements Q4, Q14 are turned on or off are determined taking such a phase difference into consideration.

Functions of the charging circuit for a vehicle described above will now be described.

Except when the battery 17 is being charged, the battery forklift is disconnected from the three-phase alternating-current power source 11. The controller 21 performs on-off control of the switching elements Q1 to Q6 of the vehicle-driving inverter 15, thereby converting the direct-current power of the battery 17 to an alternating-current power to be supplied to and drive the vehicle-driving motor 16. Also, the controller 21 performs on-off control of the switching elements Q11 to Q16 of the cargo-handling inverter 25, thereby converting the direct-current power of the battery 17 to an alternating-current power to be supplied to and drive the cargo-handling motor 26.

When the vehicle-driving motor 16 is driven by the power of the battery 17, the first single-phase output section 13A remains connected to the vehicle-driving motor 16. However, the connecting point "b" between the first single-phase output section 13A and the vehicle-driving motor 16 is the connecting point between the first switching element Q1 and the second switching element Q2, which corresponds to one phase of the vehicle-driving inverter 15. Thus, even if the voltage of the connecting point "b" changes, the current preferentially flows to the diode D of the corresponding phase or the switching element Q2 in the ON state, and is prevented from flowing to the first single-phase output section 13A. Therefore, the vehicle-driving motor 16 is reliably driven without disconnecting the first single-phase output section 13A from the vehicle-driving inverter 15. The same applies to the cargo-handling motor 26. That is, the cargo-handling motor 26 is reliably driven without disconnecting the second single-phase output section 13B from the cargo-handling inverter 25.

When the battery 17 is charged, the three-phase alternating-current power source 11 supplies alternating-current power to the Scott connection transformer 13. Specifically, the plug of the charger cable of the three-phase alternating-current power source 11 is connected to a power receptacle of the forklift, and the switch 12 is turned on. The controller 21 performs on-off control of the third switching elements Q3, Q13 and the fourth switching elements Q4, Q14 while maintaining, in the OFF state, the switching elements Q1, Q2, Q5, Q6, Q11, Q12, Q15, and Q16 of the vehicle-driving inverter 15 and the cargo-handling inverter 25. That is, the elements in each inverter that corresponds to one phase are turned on and off, so that the inductance (coil) of the motor is used to boost the output from the Scott connection transformer 13, so that a current is supplied to the battery 17. Therefore, the vehicle-driving inverter 15 at the time when the battery 17 is charged is represented by an equivalent circuit shown in FIGS. 2A and 2B. Also, the cargo-handling inverter 25 is represented by an equivalent circuit shown in FIGS. 3A and 3B.

That is, regarding the vehicle-driving inverter 15, the first terminal 18a of the first single-phase output section 13A, which outputs an alternating current, is connected to the positive terminal of the battery 17 via the diode D1 and to the negative terminal of the battery 17 via the diode D2. The second terminal 18b of the first single-phase output section 13A is connected to the connecting point between the third switching element Q3 and the fourth switching element Q4 via the coil V of the vehicle-driving motor 16. Regarding the cargo-handling inverter 25, the first terminal 19a of the second single-phase output section 13B, which outputs an alternating current, is connected to the positive terminal of the battery 17 via the diode D3 and to the negative terminal of the battery 17 via the diode D4. The second terminal 19b of the second single-phase output section 13B is connected to the connecting point between the third switching element Q13 and the fourth switching element Q14 via the coil V of the cargo-handling motor 26.

In the vehicle-driving inverter 15, a current flows as indicated by the arrow of a broken line in FIG. 2A when power is output from the first terminal 18a of the first single-phase output section 13A, the third switching element Q3 is ON, and the fourth switching element Q4 is OFF. That is, the current flows through a path of the first terminal 18a→the diode D1→the third switching element Q3→the coil V of the vehicle-driving motor 16→the second terminal 18b, so that electromagnetic energy is accumulated in the coil V. When the third switching element Q3 is turned off with the fourth switching element Q4 remaining OFF, the electromagnetic energy accumulated in the coil V generates a current represented by the arrow of a line formed by a long dash alternating with two short dashes in FIG. 2A. That is, a current is generated that flows through a path of the coil V of the vehicle-driving motor 16→the second terminal 18b→the first terminal 18a→the diode D1→the battery 17→the diode D of the fourth switching element Q4→the coil V of the vehicle-driving motor 16. The generated current, together with the current from the first single-phase output section 13A, charges the battery 17. When the voltage of the first single-phase output section 13A is represented by V0, the voltage of the accumulated electromagnetic energy in the coil V is represented by VL, and the battery voltage is represented by VB, VB=VL+V0.

Figure 5A:
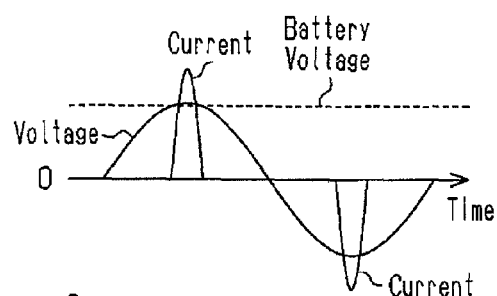
FIG. 5A is a graph showing changes over time of the voltage and current at a part "e" in the charging circuit shown in FIG. 4.
Figure 5C:
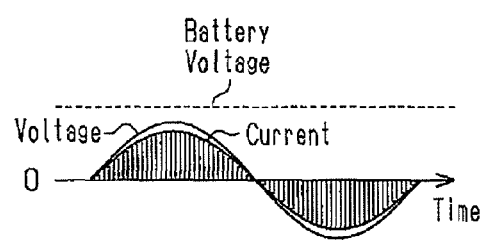
FIG. 5C is a graph showing changes over time of the voltage and current at a part "c" in the circuit shown in FIG. 2.

The fourth switching element Q4 is maintained in the OFF state and the third switching element Q3 is turned on and off several times during half the cycle of the sinusoidal waveform of the voltage as shown in FIG. 5C, such that the waveform of the output current of the first single-phase output section 13A matches with the sinusoidal voltage waveform. For purposes of illustration, the switching cycle (interval) of the switching element Q4 is shown as a period shorter than in reality.

Next, a current flows as indicated by the arrow of a broken line in FIG. 2B when power is output from the second terminal 18b of the first single-phase output section 13A, the third switching element Q3 is OFF, and the fourth switching element Q4 is ON. That is, the current flows through a path of the second terminal 18b→the coil V of the vehicle-driving motor 16→the fourth switching element Q4→the diode D2→the first terminal 18a, so that electromagnetic energy is accumulated in the coil V. When the fourth switching element Q4 is turned off with the third switching element Q3 remaining OFF, the electromagnetic energy accumulated in the coil V generates a current represented by the arrow of a line formed by a long dash alternating with two short dashes in FIG. 2B. That is, a current is generated that flows through a path of the diode D of the third switching element Q3→the battery 17 the diode D2→the first terminal 18a→the second terminal 18b→the coil V of the vehicle-driving motor 16. The generated current, together with the current from the first single-phase output section 13A, charges the battery 17. When the voltage of the first single-phase output section 13A is represented by V0, the voltage of the accumulated electromagnetic energy in the coil V is represented by VL, and the battery voltage is represented by VB, VB=VL+V0. As described above, no three-phase current is supplied to the vehicle-driving motor 16 when the alternating-current output from the first single-phase output section 13A is boosted to charge the battery 17. Thus, the vehicle-driving motor 16 is not rotated, and does not need to be disconnected during charging.

Charging with the cargo-handling inverter 25 is performed basically in the same manner as the charging with the vehicle-driving inverter 15. Specifically, the above description of charging with the vehicle-driving inverter 15 can be applied by replacing the first single-phase output section 13A, the terminals 18a, 18b, the third and fourth switching elements Q3, Q4, the diodes D1, D2, and the vehicle-driving motor 16 by the second single-phase output section 13B, the terminals 19a, 19b, the third and fourth switching elements Q13, Q14, the diodes D3, D4, and the cargo-handling motor 26, respectively.

That is, a current flows as indicated by the arrow of a broken line in FIG. 3A when power is output from the first terminal 19a of the second single-phase output section 13B, the third switching element Q13 is ON and the fourth switching element Q14 is OFF, so that electromagnetic energy is accumulated in the coil V. When the third switching element Q13 is turned off with the fourth switching element Q14 remaining to be OFF, the electromagnetic energy accumulated in the coil V generates a current represented by the arrow of a line formed by a long dash alternating with two short dashes in FIG. 3A. The generated current, together with the current from the second single-phase output section 13B, charges the battery 17.

Next, a current flows as indicated by the arrow of a broken line in FIG. 3B when power is output from the second terminal 19b of the second single-phase output section 13B, the third switching element Q13 is OFF, and the fourth switching element Q14 is ON, so that electromagnetic energy is accumulated in the coil V. When the fourth switching element Q14 is turned off with the third switching element Q13 remaining to be OFF, the electromagnetic energy accumulated in the coil V generates a current represented by the arrow of a line formed by a long dash alternating with two short dashes in FIG. 3B. The generated current, together with the current from the second single-phase output section 13B, charges the battery 17. As described above, no three-phase current is supplied to the cargo-handling motor 26 when the alternating-current output from the second single-phase output section 13B is boosted to charge the battery 17. Thus, the cargo-handling motor 26 is not rotated and does not need to be disconnected during charging.

Figure 4:
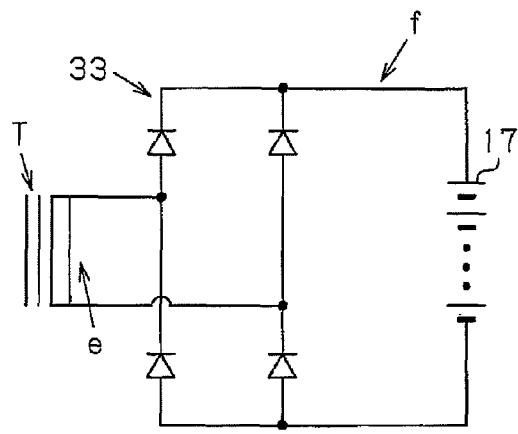
FIG. 4 is a diagram showing the charging circuit when a full-wave rectifier is connected to a transformer to charge a battery.
Figure 5B:
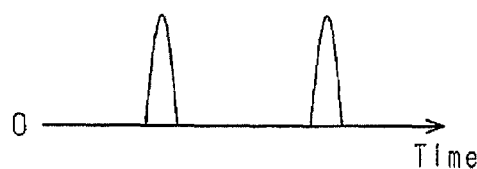
FIG. 5B is a graph showing changes over time of the current at a part "f" in the charging circuit shown in FIG. 4.

When charging is performed in a circuit where the battery 17 is connected to the terminals on the secondary side of a quasi-constant voltage transformer T via a full-wave rectifier circuit 33 as shown in FIG. 4, the voltage and current at a part "e" in FIG. 4, that is, the output section of the quasi-constant voltage transformer T change as shown in FIG. 5A. When the quasi-constant voltage transformer T is used, a current flows through the circuit when the voltage of the output section is higher than the battery voltage. Thus, the current at a part "f" in FIG. 4, that is, the current supplied to the battery 17 changes as shown in FIG. 5B. That is, the output current of the quasi-constant voltage transformer T is a harmonic current that flows only in the vicinity of the peaks of the sinusoidal output voltage waveform. This reduces the power factor.

Figure 5D:
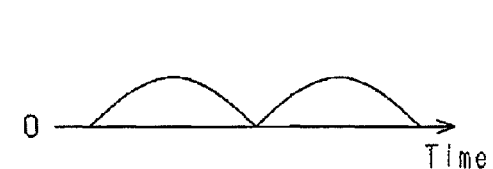
FIG. 5D is a graph showing changes over time of the current at a part "d" in the circuit shown in FIG. 2.
Figure 6:
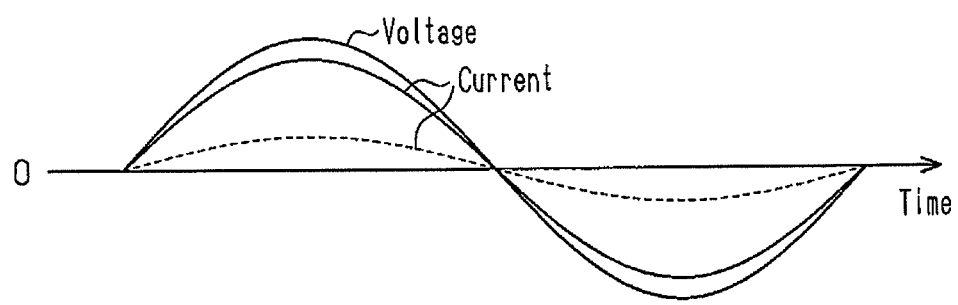
FIG. 6 is a graph showing changes over time of the value of an output current from a single-phase output section of the battery charging circuit of FIG. 1 when performing charging.

In the present embodiment, the third switching elements Q3, Q13 and the fourth switching elements Q4, Q14 are subjected to the on-off control such that the current waveform of the secondary side output section of the Scott connection transformer 13, that is, the current waveform of the single-phase output sections 13A, 13B, matches with the voltage waveform thereof, that is, such that the current waveform becomes a sinusoidal waveform in the same phase as the sinusoidal output voltage waveform. In other words, during a half cycle in which the sinusoidal output voltage waveform is positive, the fourth switching elements Q4, Q14 are maintained in the OFF state, and the third switching elements Q3, Q13 are subjected to on-off control several times. Also, during a half cycle in which the output voltage waveform is negative, the third switching elements Q3, Q13 are maintained in the OFF state, and the fourth switching elements Q4, Q14 are turned on and off several times. As a result, the output current of each of the single-phase output sections 13A, 13B becomes a sinusoidal waveform in the same phase as the output voltage waveform. The current supplied to the battery 17 changes as shown in FIG. 5D. This allows constant current charging of the battery 17 to be performed. Also, since the alternating current and the alternating voltage are in the same phase, the power factor is raised.

Specifically, the controller 21 controls switching of the third switching elements Q3, Q13 and the fourth switching elements Q4, Q14, so as to match the current waveform of the single-phase output sections 13A, 13B with the voltage waveforms thereof, based on detection signals of the current sensors 31, 32. As a result, as shown in FIG. 5C, the output current of each of the single-phase output sections 13A, 13B is controlled to have a great current value when the output voltage has a great value, and to have a small current value when the output voltage has a small value. Accordingly, the current flows over the entire cycle of the voltage of the alternating-current power source input to the Scott connection transformer 13. This allows constant current charging of the battery 17 to be performed. Also, since the alternating current and the alternating voltage are in the same phase, the power factor is improved, and the harmonic current is reduced.

When constant current charging is performed, the voltage output from each of the single-phase output section 13A, 13B is output as a sine wave having a constant average voltage. However, the current output from each of the single-phase output sections 13A, 13B is increased as represented by a solid line in FIG. 6 in the initial stage of charging by changing the switching cycles of the third switching elements Q3, Q13 and the fourth switching element Q4, Q14. Towards the end of the charging (close to the full charge), the current comes to have a small value as represented by a broken line in FIG. 6.

The present embodiment has the following advantages.

(1) The battery charging circuit is provided in the motor drive system having a three-phase inverter (the vehicle-driving inverter 15) and a three-phase motor (the vehicle-driving motor 16) controlled by the three-phase inverter. The battery charging circuit is connected to a single-phase output transformer (the Scott connection transformer 13) and the first terminal 18a of the secondary side output section of the single-phase output transformer, and includes the rectifier circuit 14, which is connected in parallel with a three-phase inverter and the battery 17. The connecting point between the set of the switching elements Q1 and Q2, which forms one of three phases in the three-phase inverter, is connected to the second terminal 18b of the secondary side output section of the single-phase output transformer via the line 20. During charging, the controller 21 maintains the set of the switching elements Q1, Q2 in the OFF state and performs on-off control of at least one set of the other two sets of the switching elements Q3, Q4, Q5, Q6 (in the present embodiment, the third and fourth switching elements Q3, Q4). Therefore, constant current charging can be performed by adding a small number of components, without modifying connections between the coils of a motor or connection between inverters and motor coils mounted on a vehicle. Also, no switch is required for disconnecting the single-phase output transformer and the inverter when charging is not performed. Accordingly, the operation of the motor or charging is not disturbed by a malfunction of such a switch. Also, since no switch for disconnecting the motor from the circuit or no switch for disconnecting a charger from the circuit is required, a charging circuit (charger) free from mechanical deterioration is obtained.

(2) The controller 21 performs on-off control of the switching elements Q3, Q4, Q13, Q14, so as to match the current waveforms of the single-phase output sections (secondary side output sections) 13A, 13B of the Scott connection transformer 13 with the voltage waveforms thereof, during charging. Thus, constant current charging of a battery can be performed by an alternating-current power source. Also, since the alternating current and the alternating voltage are in the same phase, the power factor is raised. This reduces the input power, that is, the primary side current of the transformer, and therefore allows the capacity of the circuit breaker to be reduced.

(3) The battery charging circuit is employed in a battery forklift having the vehicle-driving motor 16 and the cargo-handling motor 26 as motor drive systems. The single-phase output transformer is the Scott connection transformer 13. The vehicle-driving inverter 15 is connected to one single-phase output section 13A, and the cargo-handling inverter 25 is connected to the other single-phase output section 13B. Therefore, by employing the battery charging circuit in the battery forklift and using the Scott connection transformer 13 as a single-phase output transformer, charging with three-phase alternating current is made possible by adding the minimum number of components. Also, since the battery 17 is charged simultaneously by the single-phase output sections 13A, 13B, the charging time is shortened.

(4) During charging, the controller 21 performs on-off control of the switching elements Q1 to Q6 and Q11 to Q16, thereby using the vehicle-driving inverter 15 and the cargo-handling inverter 25, and the coils V of the vehicle-driving motor 16 and the cargo-handling motor 26 to boost the voltage of the alternating-current output of the single-phase output sections 13A, 13B, and performing constant current charging. Therefore, charging is possible even if the alternating output voltage of the single-phase output sections 13A, 13B is lower than the terminal voltage of the battery 17.

(5) During charging, charging is performed by boosting the alternating current of the single-phase output sections 13A, 13B of the transformer. This eliminates the necessity of a full-wave rectifier circuit as a rectifier circuit. Compared to a case where a full-wave rectifier circuit is used, the number of components of the rectifier circuits is reduced.

(Second Embodiment)

A second embodiment will now be described with reference to FIGS. 7 to 9. The present embodiment is different from the first embodiment in that a circuit used for charging is used to convert the power of a battery to an alternating-current power to be supplied to the primary side of a Scott connection transformer. Like or the same reference numerals are given to those components that are like or the same as the corresponding components of the first embodiment, and the explanations thereof are omitted.

Figure 7:
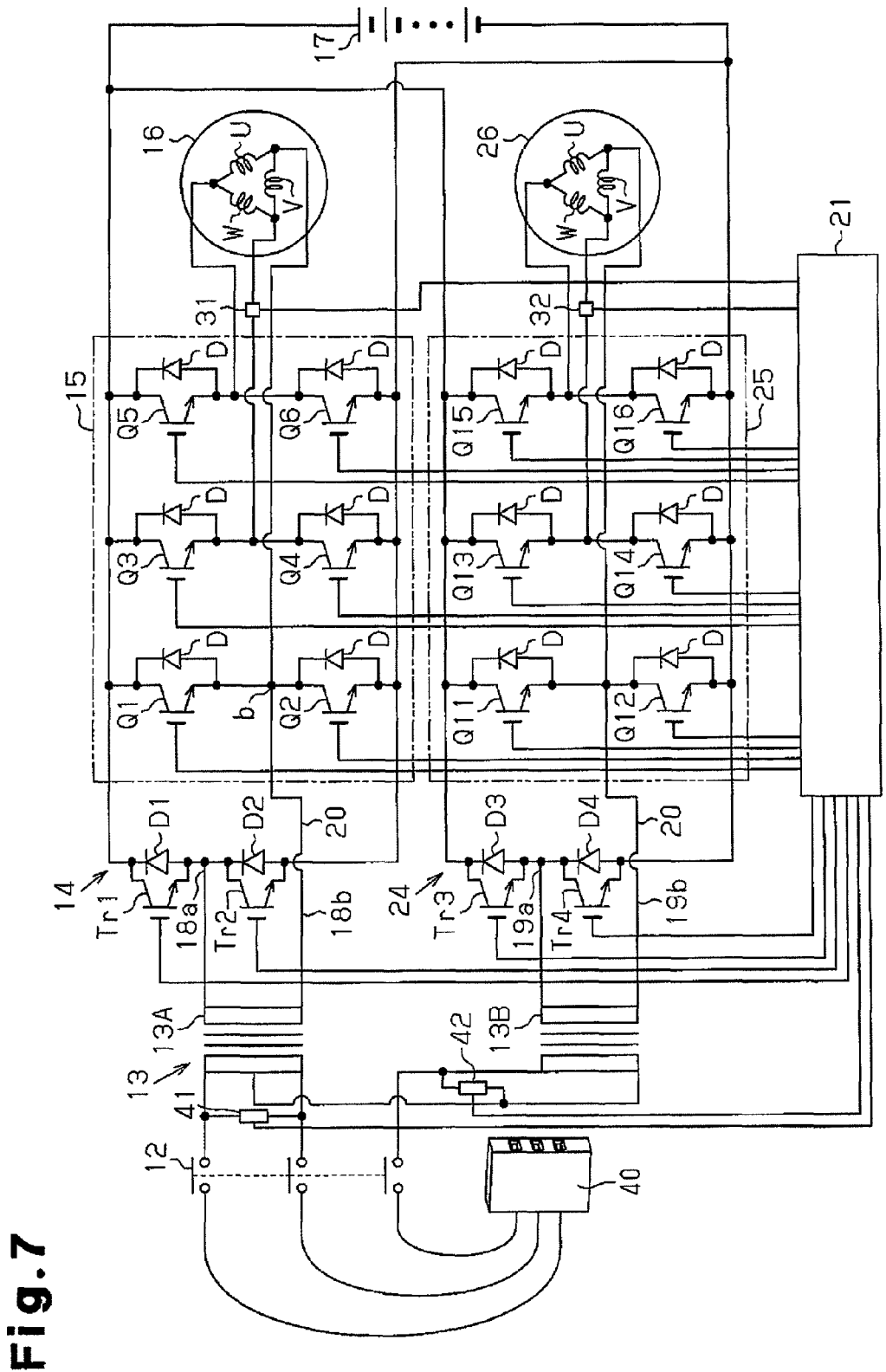
FIG. 7 is a circuit diagram of a battery charging circuit according to a second embodiment, the circuit being capable of supplying the power of a battery to the primary side of a Scott connection transformer.

As shown in FIG. 7, a first rectifier circuit 14 is connected to a vehicle-driving inverter 15. The first rectifier circuit 14 is formed by diodes D1, D2. Transistors Tr1, Tr2 serving as switching elements are connected in parallel with the diodes D1, D2, respectively. A second rectifier circuit 24 is connected to a cargo-handling inverter 25. The second rectifier circuit 24 is formed by diodes D3, D4. Transistors Tr1, Tr4 serving as switching elements are connected in parallel with the diodes D3, D4, respectively. That is, the first rectifier circuit 14 includes a series circuit and switching elements. The series circuit includes diodes D1, D2 that are connected in series such that the cathodes are arranged on the positive side of the first rectifier circuit 14. Each switching element is connected in parallel with one of the diodes D1, D2, which are divided parts of the series circuit. The second rectifier circuit 24 includes a series circuit and switching elements. The series circuit includes diodes D3, D4 that are connected in series such that the cathodes are arranged on the positive side of the second rectifier circuit 24. Each switching element is connected in parallel with one of the diodes D3, D4, which are divided parts of the series circuit. These switching elements are subjected to on-off control when the power of the battery is supplied to the primary side of the transformer, and are maintained in the OFF state in other cases. The transistors Tr1 to Tr4 are insulated-gate bipolar transistors (IGBTs).

The gates of the transistors Tr1 to Tr4 function as control terminals and are connected to a controller 21. A Scott connection transformer 13 is typically connected to a socket (receptacle) 40 used for charging the battery 17. When charging the battery 17, the Scott connection transformer 13 is connected to a three-phase alternating-current power source (not shown), or a commercial power source, via the socket 40.

The controller 21 is connected to voltage sensors 41, 42, which detect primary side voltages corresponding to the single-phase output sections 13A, 13B of the Scott connection transformer 13. The memory of the controller 21 stores programs needed to maintain the transistors Tr1 to Tr4 in the OFF state and control the switching elements Q1 to Q6 and Q11 to Q16 when charging the battery 17 with the Scott connection transformer 13 connected to the three-phase alternating-current power source. The memory also stores programs needed to control the transistors Tr1 to Tr4 and the switching elements Q1 to Q6 and Q11 to Q16 when supplying the power of the battery 17 to the primary side of the Scott connection transformer 13.

When supplying the power of the battery 17 to the primary side of the Scott connection transformer 13, the controller 21 performs on-off control of the transistors Tr1 to Tr4 and one set of switching elements that corresponds to one phase of each three-phase inverter. In the present embodiment, among the sets of switching elements in the three-phase inverters, the set of the switching elements Q3, Q4 for the V-phase of the vehicle-driving inverter 15 and the set of the switching elements Q13, Q14 for the V-phase of the cargo-handling inverter 25 are subjected to on-off control.

Functions of the charging circuit for a vehicle described above will now be described.

Except when the power of the battery 17 is supplied to the primary side of the Scott connection transformer 13, the transistors Tr1 to Tr4 are maintained in the OFF state. In this state, the vehicle-driving motor 16 and the cargo-handling motor 26 are driven or the battery 17 is charged as in the first embodiment.

When the power of the battery 17 is supplied to the primary side of the Scott connection transformer 13, that is, when another electrical device is driven using the power of the battery 17, the power of the battery 17 is supplied with the plug of the electrical device connected to the socket 40. At this time, the switching elements Q1, Q2, Q5, Q6 of the vehicle-driving inverter 15 and the switching elements Q11, Q12, Q15, Q16 of the cargo-handling inverter 25 are maintained in the OFF state, and the switching elements Q3, Q4, Q13, Q14 and the transistors Tr1 to Tr4 are subjected to on-off control. Therefore, when power is supplied from the battery 17 to the Scott connection transformer 13, the vehicle-driving inverter 15 and the cargo-handling inverter 25 are expressed as equivalent circuits shown in FIGS. 8 and 9. While monitoring detection signals of the voltage sensors 41, 42, the controller 21 performs on-off control of the transistors Tr1 to Tr4 and the switching elements Q3, Q4, Q13, Q14 such that a three-phase alternating current of 200 V having a sinusoidal waveform is output to the primary side of the Scott connection transformer 13.

Figure 8:
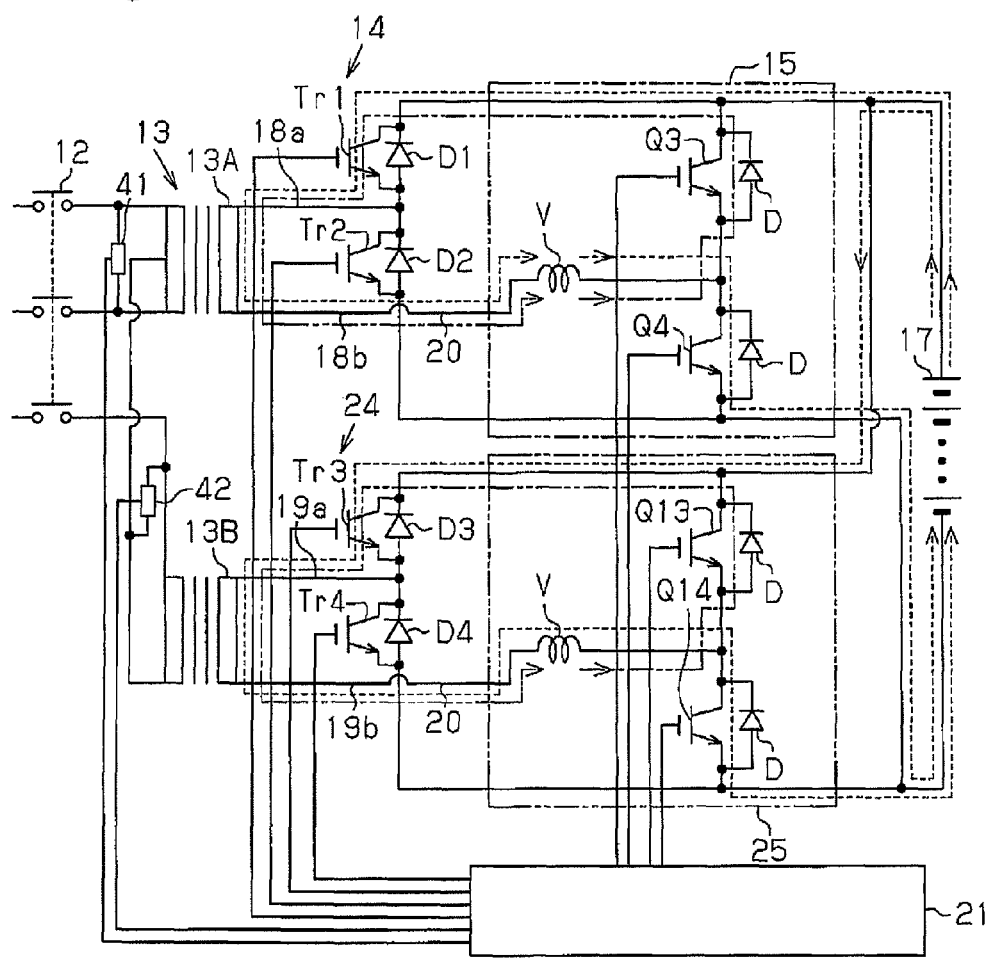
FIGS. 8 and 9 are equivalent circuit diagrams of the vehicle-driving inverter and the cargo-handling inverter in a circuit shown in FIG. 7, when the power of the battery is supplied to the primary side of the Scott connection transformer.

Specifically, in the vehicle-driving circuit of the equivalent circuit shown in FIG. 8, a current flows as indicated by broken lines in FIG. 8 when the transistor Tr1 is on, the transistor Tr2 is off, the third switching element Q3 is off, and the fourth switching element Q4 is on. That is, the current flows through a path of the positive terminal of the battery 17→the transistor Tr1→the first terminal 18a→the second terminal 18b→the coil V→the fourth switching element Q4→the negative terminal the battery 17.

When, in the cargo-handling circuit, the transistor Tr3 is on, the transistor Tr4 is off, the third switching element Q13 is off, and the fourth switching element Q14 is on, a current flows through a path of the positive terminal of the battery 17→the transistor Tr3→the first terminal 19a→the second terminal 19b→the coil V→the fourth switching element Q14→the negative terminal of the battery 17.

Figure 9:
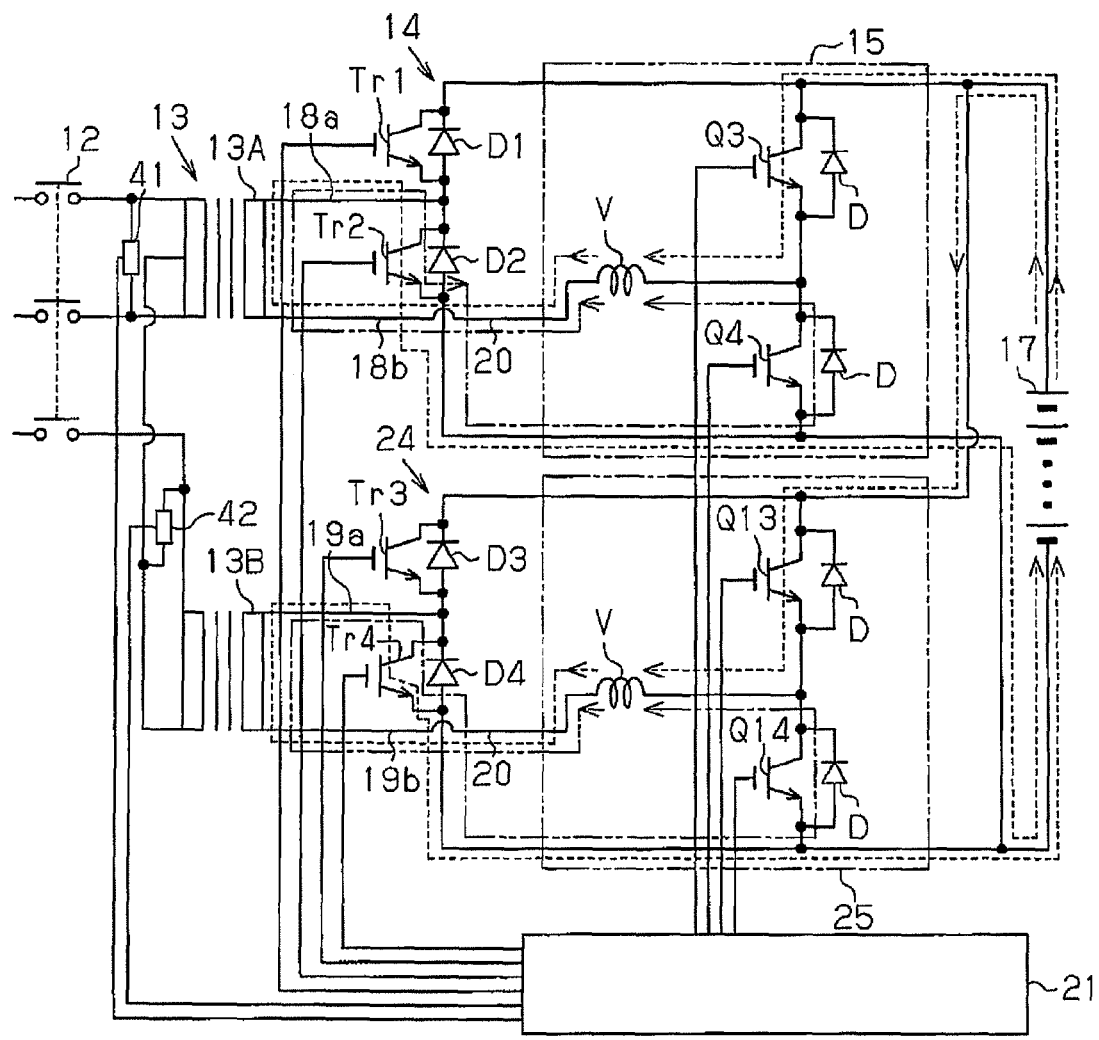

Also, in the vehicle-driving circuit of the equivalent circuit shown in FIG. 9, a current flows as indicated by broken lines in FIG. 9 when the transistor Tr1 is off, the transistor Tr2 is on, the third switching element Q3 is on, and the fourth switching element Q4 is off. That is, the current flows through a path of the positive terminal of the battery 17→the third switching element Q3→the coil V→the second terminal 18b→the first terminal 18a→the transistor Tr2→the negative terminal the battery 17.

Also, in the cargo-handling circuit, a current flows as indicated by broken lines in FIG. 9 when the transistor Tr3 is off, the transistor Tr4 is on, the third switching element Q13 is on, and the fourth switching element Q14 is off. That is, the current flows through a path of the positive terminal of the battery 17→the third switching element Q13→the coil V→the second terminal 19b→the first terminal 19a→the transistor Tr4→the negative terminal the battery 17.

Therefore, an alternating current through the first single-phase output section 13A is generated by controlling the circuits to alternately repeat the two states: the state in which the transistor Tr1 and the fourth switching element Q4 are on, and the transistor Tr2 and the third switching element Q3 are off; and the state in which the transistor Tr1 and the fourth switching element Q4 are off, and the transistor Tr2 and the third switching element Q3 are on. Also, an alternating current through the second single-phase output section 13B is generated by controlling the circuits to alternately repeat the two states: the state in which the transistor Tr3 and the fourth switching element Q14 are on, and the transistor Tr4 and the third switching element Q13 are off; and the state in which the transistor Tr3 and the fourth switching element Q14 are off, and the transistor Tr4 and the third switching element Q13 are on. By controlling the vehicle-driving inverter 15 and the cargo-handling inverter 25 to synchronize with each other, a three-phase alternating current is output to the input of the Scott connection transformer 13, and the power of the battery 17 is supplied as a three-phase alternating current to the electrical device connected to the socket 40. However, since the phases of the two single-phase output sections 13A, 13B are different from each other, the timing at which the transistors Tr1 to Tr4, the third switching elements Q3, Q13 and the fourth switching elements Q4, Q14 are turned on or off are determined taking such a phase difference into consideration.

When the fourth switching element Q4 is turned off while a current is flowing along the path shown by the broken lines in FIG. 8, the current flows along a path represented by lines formed by a long dash alternating with two short dashes in FIG. 8, that is, through a path of the coil V→the diode D of the third switching element Q3→the transistor Tr1→the first terminal 18a→the second terminal 18b→the coil V. Therefore, while maintaining the transistor Tr1, the transistor Tr2, and the third switching element Q3 in the same one of the ON and OFF states, a current having a sinusoidal waveform can be generated through the first single-phase output section 13A by controlling the on-off time of the fourth switching element Q4. The controller 21 controls the on-off time of the fourth switching element Q4 such that a current having a sinusoidal waveform flows through the first single-phase output section 13A.

Likewise, in the cargo-handling circuit, when the fourth switching element Q14 is turned off while a current is flowing along the path shown by the broken lines in FIG. 8, the current flows along a path represented by lines formed by a long dash alternating with two short dashes in FIG. 8, that is, through a path of the coil V→the diode D of the third switching element Q13→the transistor Tr3→the first terminal 19a→the second terminal 19b→the coil V. Therefore, while maintaining the transistor Tr3, the transistor Tr4, and the third switching element Q13 in the same one of the ON and OFF states, a current having a sinusoidal waveform can be generated through the second single-phase output section 13B by controlling the on-off time of the fourth switching element Q14. The controller 21 controls the on-off time of the fourth switching element Q14 such that a current having a sinusoidal waveform flows through the second single-phase output section 13B.

When the third switching element Q3 is turned off while a current is flowing along the path shown by the broken lines in FIG. 9, the current flows along a path represented by lines formed by a long dash alternating with two short dashes in FIG. 9, that is, through a path of the coil V→the second terminal 18b→the first terminal 18a→the transistor Tr2→the diode D of the fourth switching element Q4→the coil V. Therefore, while maintaining the transistors Tr1 and Tr2, and the fourth switching element Q4 in the same one of ON and OFF states, a current having a sinusoidal waveform can be generated through the first single-phase output section 13A by controlling the on-off time of the third switching element Q3. The controller 21 controls the on-off time of the third switching element Q3 such that a current having a sinusoidal waveform flows through the first single-phase output section 13A.

Likewise, in the cargo-handling circuit, when the third switching element Q13 is turned off while a current is flowing along the path shown by the broken lines in FIG. 9, the current flows along a path represented by lines formed by a long dash alternating with two short dashes in FIG. 9, that is, through a path of the coil V→the second terminal 19b→the first terminal 19a→the transistor Tr4→the diode D of the fourth switching element Q14→the coil V. Therefore, while maintaining the transistors Tr1 and Tr2, and the fourth switching element Q4 in the same one of the ON and OFF states, a current having a sinusoidal waveform can be generated through the second single-phase output section 13B by controlling the on-off time of the third switching element Q13. The controller 21 controls the on-off time of the third switching element Q13 such that a current having a sinusoidal waveform flows through the second single-phase output section 13B.

Accordingly, the second embodiment has the following advantages in addition to the advantages (1) to (5) of the first embodiment.

(6) To convert the power of the battery 17 to an alternating-current power and supply it to a 200 V line (a commercial line), six dedicated elements (transistors) are needed. However, through the utilization of the three-phase motors (the vehicle-driving motor 16 and the cargo-handling motor 26) and the vehicle-driving inverter 15 and the cargo-handling inverter 25 for controlling the three-phase motors, which are incorporated in the battery vehicle, the controller 21 is capable of supplying the power of the battery 17 to the 200 V line by using the four switching elements (the transistors Tr1, T2, Tr3, and Tr4), which are connected in parallel with the diodes D1, D2, D3, and D4 of the rectifier circuits 14, 24, respectively. Therefore, when a failure of the commercial power source occurs, or at a location where a commercial power source is not available, electrical devices that is driven by 200 V power source (commercial power source) can be used.

During charging, instead of subjecting, to on-off control, the set of the switching elements Q3 and Q4 of the vehicle-driving inverter 15 or the set of the switching element Q13, Q14 of the cargo-handling inverter 25, the switching elements Q3, Q4, Q13, Q14 and the switching element Q5, Q6, Q15, Q16 may be alternately subjected to on-off control. In this case, the state in which charging is performed with a current flowing through the switching elements Q3, Q4, Q13, and Q14 and the state in which charging is performed with a current flowing through the switching elements Q5, Q6, Q15 and Q16 is repeated alternately. This decentralizes heating of the switching elements and reduces the overheating of the inverters. The charging current that can be supplied to the inverters is therefore increased.

During charging, sets of the switching elements Q3, Q4, Q5, Q6, Q13, Q14, Q15, Q16 may be subjected to on-off control, while maintaining, in the OFF state, the set of the switching elements Q1 and Q2 of the vehicle-driving inverter 15 and the set of the switching element Q11, Q12 of the cargo-handling inverter 25. Specifically, the third and fifth switching elements Q3 and Q5 are controlled to be in the same one of the ON and OFF states, and the fourth and sixth switching elements Q4 and Q6 are controlled to be in the same one of the ON and OFF states. Also, the third and fifth switching elements Q13 and Q15 are controlled to be in the same one of the ON and OFF states, and the fourth and sixth switching elements Q14 and Q16 are controlled to be in the same one of the ON and OFF states. In this case, a current is dispersed to switching elements of different sets during charging. This decentralizes heating of the switching elements and reduces the overheating of the inverters. The charging current that can be supplied to the inverters is therefore increased.

Figure 10:
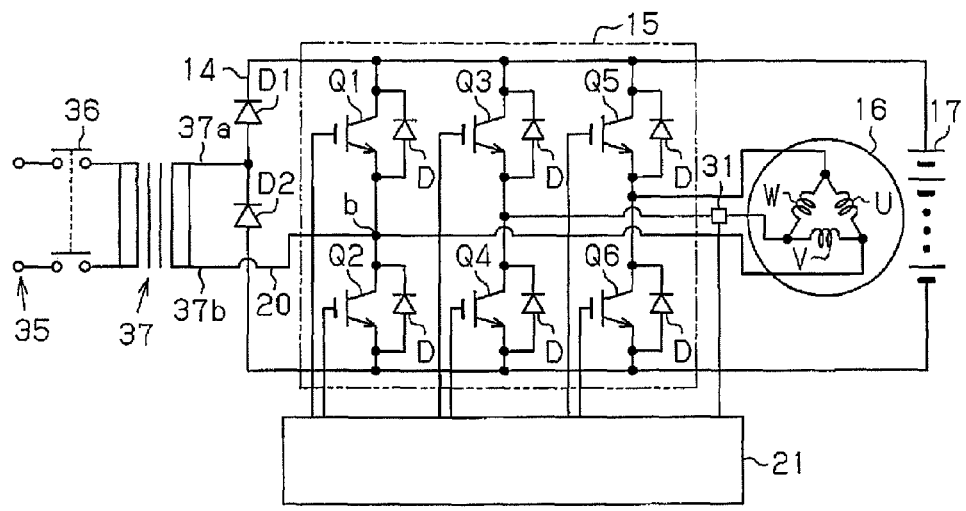
FIG. 10 is a circuit diagram showing another embodiment.

The battery charging circuit does not necessarily have to be used in vehicles having two three-phase motors such as battery forklifts, but may be used in a vehicle charging circuit in an electrical vehicle having a single three-phase motor (for example, a vehicle-driving motor). In this case, as shown in FIG. 10, the battery charging circuit includes a single-phase output transformer 37 connected to a single-phase alternating-current power source 35 (for example, 200 V alternating-current power source) via a switch 36. The secondary side output section of the single-phase transformer 37 is connected to a rectifier circuit 14, a vehicle-driving inverter 15, and a vehicle-driving motor 16. The rectifier circuit 14 is a series circuit having two diodes D1, D2 connected in series, and the connecting point between the diodes D1, D2 is connected to a first terminal 37a of the single-phase transformer 37. The connecting point "b" between the emitter of the switching element Q1 and the collector of the switching element Q2 is connected to a second terminal 37b of the single-phase transformer 37 via a line 20. The positive terminal of the rectifier circuit 14 is connected to the positive terminal of the battery 17, and the negative terminal is connected to the negative terminal of the battery 17. In this case, the battery 17 is charged in the same manner as in the charging of the vehicle-driving inverter 15. Also, a household power source can be used for charging.

The power of the battery 17 can be converted to an alternating-current power and supplied to a commercial line. In such a case, while maintaining the transistor Tr2, and the third and fourth switching elements Q3 and Q4 in the same one of the ON and OFF states, a current having a sinusoidal waveform may be generated through the single-phase output section 13A by controlling the on-off time of the transistor Tr1, with a current flowing along the path shown by the broken lines in FIG. 8. While maintaining the transistor Tr4, and the third and fourth switching elements Q13 and Q14 in the same one of the ON and OFF states, a current having a sinusoidal waveform may be generated through the single-phase output section 13B by controlling the on-off time of the transistor Tr3.

Figure 11:
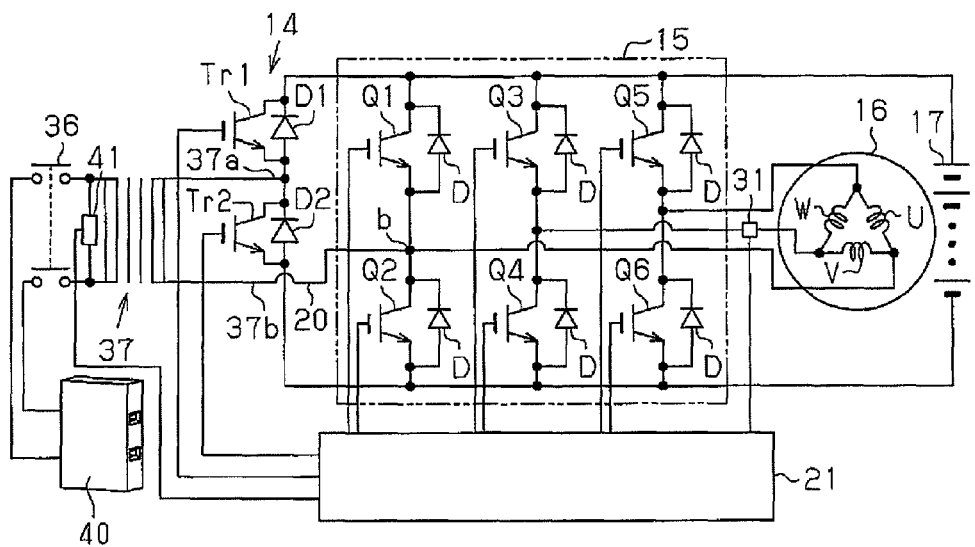
FIG. 11 is a circuit diagram showing another embodiment.

Even in a case where the battery charging circuit is used as a vehicle charging circuit of a typical electrical vehicle having a single three-phase motor (for example, a vehicle-driving motor), the battery charging circuit may be configured to be capable of converting the power of the battery 17 to an alternating-current power and supplying it to a commercial line. For example, as shown in FIG. 11, transistors Tr1, Tr2 are connected in parallel with the diodes D1, D2 of the rectifier circuit 14, respectively. The controller 21 controls the transistors Tr1 and Tr2, and the switching elements Q1 to Q6, in the same manner as the charging and conversion-supply according to the second embodiment.

In addition to the controller 21, which controls the switching elements Q1 to Q6, and Q11 to Q16, another control circuit for controlling the transistors Tr1 to Tr4 may be provided. However, since the charging circuit includes the controller 21 for controlling the vehicle-driving inverter 15 and the cargo-handling inverter 25, using the same controller 21 to control the transistors Tr1 to Tr4 when conversion-supply of a current reduces the number of components.

Vehicles in which the battery charging circuit is used are not limited to electrical vehicles having a battery to supply power, but may be hybrid vehicles having, in addition to a gasoline engine or a diesel engine, a vehicle-driving motor that receives power from a battery.

The battery charging circuit may be used in a motor drive system having three sets of a motor and an inverter. In this case, a three-phase transformer having three single-phase output sections is used, and inverters and rectifier circuits are connected to each of the single-phase output sections.

As long as it has a three-phase motor that receives power from a battery and is controlled by a three-phase inverter, the motor drive system does not need to be a motor drive system mounted on a vehicle, but may be, for example, a motor drive system of mechanical equipment mounted and transported on a trailer.

One of the two terminals of the single output section of the transformer is connected to a rectifier circuit. The other terminal is connected to a three-phase inverter via a line 20. A set of switching elements corresponding to one phase of the three-phase inverter does not need to be the set of the switching elements Q1 and Q2 (or the set of the switching elements Q11 and Q12) for the U-phase. For example, the set of switching elements may be the set of the switching elements Q3 and Q4 for the V-phase (or the set of the switching elements Q13 and Q14) or the set of the switching elements Q5, Q6 of the W-phase (or the set of the switching elements Q15 and Q16).

The connection among the coils U, V, and W of the vehicle-driving motor 16 and the cargo-handling motor 26 is not limited to a delta connection, but may be a star connection.

As switching elements used in the vehicle-driving inverter 15 and the cargo-handling inverter 25, bipolar transistors or MOSFETs may be used instead of IGBTs. A MOSFET has a parasitic diode. Therefore, when used, MOSFETs eliminate the necessity for connecting diodes D and therefore simplify the structure of the battery charging circuit, unlike a case where IGBTs or bipolar transistors, which have no parasitic diodes, are used as switching elements.

In place of IGBTs used as the transistors Tr1 to Tr4 of the switching elements, power bipolar transistors or MOSFETs may be used.

Each of the rectifier circuits 14, 24 may be a series circuit having three or more diodes that are connected in series. In this case, each series circuit is divided into two sections, and each of the transistors Tr1 to Tr4 is connected in parallel with one of the sections.

The charging method does not need to be the constant current-constant voltage-constant current (CC-CV-CC) method, but may be, for example, the constant current-constant voltage (CC-CV) method or the multi-step constant-current method.

The battery is not limited to a liquid type lead-acid battery, but may be, for example, a sealed lead-acid battery, a lithium-ion battery, or a nickel hydride battery.

The invention claimed is:

1. A charging circuit for charging a battery that supplies power to a motor drive system including a three-phase motor and a three-phase inverter for controlling the three-phase motor, the three-phase inverter having first to third sets of switching elements, each set corresponding to one of the three phases, the charging circuit comprising:
    a single-phase output transformer having a secondary side output section that has a first terminal and a second terminal;
    a rectifier circuit that is connected in parallel with the three-phase inverter and the battery, the rectifier circuit being connected to the first terminal of the secondary side output section;
    a line connecting a connecting point between the first set of the switching elements in the three-phase inverter with the second terminal of the secondary side output section; and
    a controller that performs on-off control of the first to third sets of the switching elements,
    wherein, during charging of the battery, the controller maintains the first set of the switching elements in an OFF state, and performs the on-off control of at least one set of the second and third sets of the switching elements.

2. The charging circuit according to claim 1, wherein, during charging of the battery, the controller performs the on-off control of at least one set of the second and third sets of the switching elements, so as to match the current waveform at the secondary side output section with the voltage waveform at the secondary side output section.

3. The charging circuit according to claim 1, wherein the rectifier circuit includes a series circuit and switching elements, the series circuit being divided into two sections and including a plurality of diodes that are connected in series with each other such that the cathodes are arranged on the positive side of the rectifier circuit, and each switching element being connected in parallel with one of the two sections of the series circuit, and
    wherein the controller performs the on-off control of one set of the switching elements that corresponds to one phase of the three-phase inverter and the switching elements of the rectifier circuit, thereby supplying the power of the battery to the primary side of the single-phase output transformer.

4. The charging circuit according to claim 1, wherein: the motor drive system is a motor drive system of a forklift that includes a vehicle-driving motor and a cargo-handling motor; the single-phase output transformer is a Scott connection transformer that includes first and second single-phase output sections; a vehicle-driving inverter is connected to the first single-phase output section; and a cargo-handling inverter is connected to the second phase output section.

5. The charging circuit according to claim 1, wherein the single-phase output transformer is configured to input a single-phase alternating current.

6. The charging circuit according to claim 1, wherein each switching element is an insulated-gate bipolar transistor, a diode being connected in antiparallel with each transistor.

7. A method for charging a battery that supplies power to a motor drive system including a three-phase motor and a three-phase inverter for controlling the three-phase motor, the three-phase inverter having first to third sets of switching elements, each set corresponding to one of the three phases, the method comprising:

providing a single-phase output transformer having a secondary side output section that has a first terminal and a second terminal;
connecting a rectifier circuit in parallel with the three-phase inverter and the battery;
connecting the rectifier circuit with the first terminal of the secondary side output section;
connecting a connecting point between the first set of the switching elements in the three-phase inverter with the second terminal of the secondary side output section; and
during charging of the battery, maintaining the first set of the switching elements in an OFF state, and performing the on-off control of at least one set of the second and third sets of the switching elements.

* * * * *